United States Patent Office 3,767,727
Patented Oct. 23, 1973

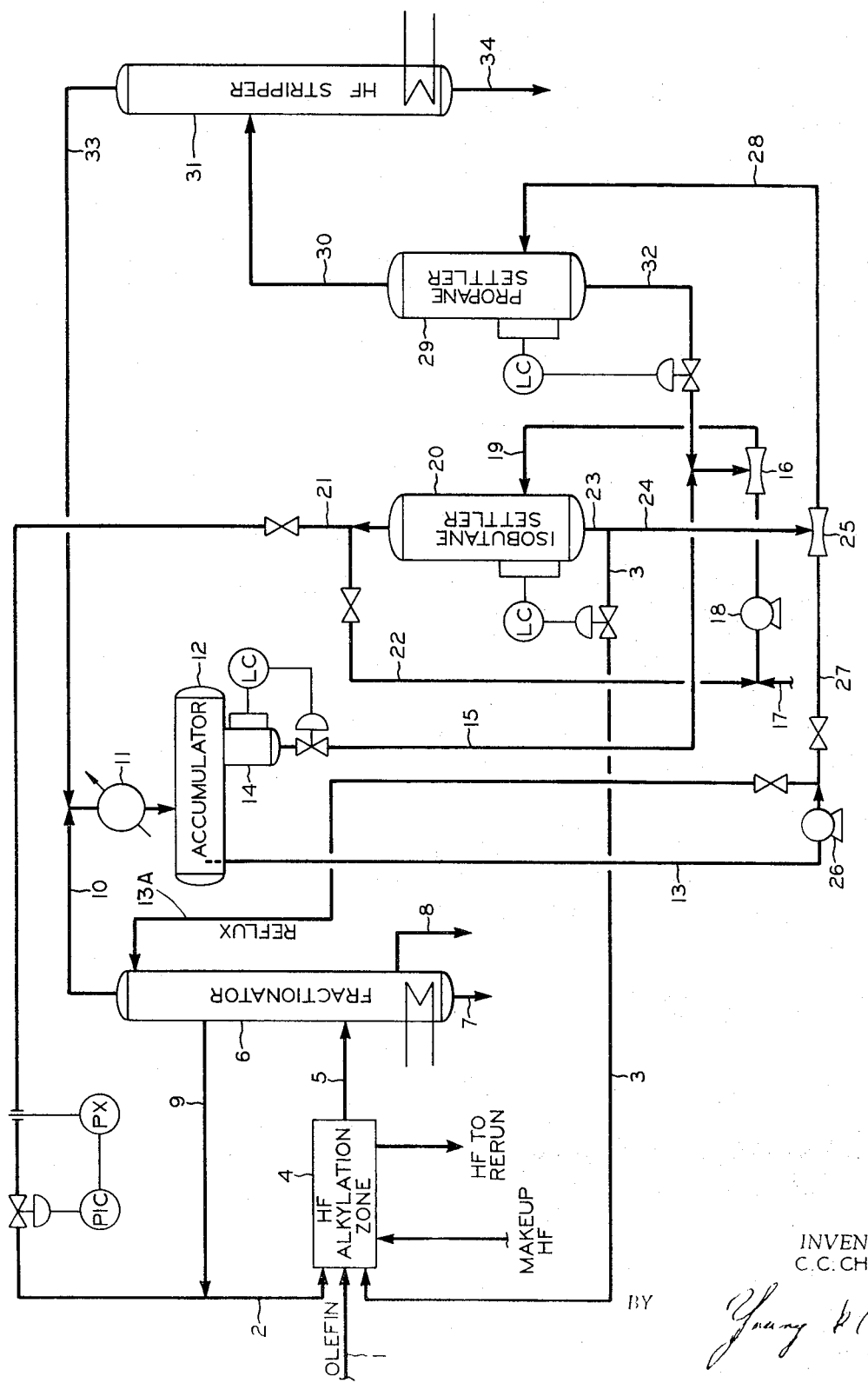

3,767,727
TREATMENT OF PROPANE IN HF ALKYLATION WITH PURIFIED HF
Charles C. Chapman, Bartlesville, Okla., assignor to Phillips Petroleum Company
Filed Sept. 1, 1971, Ser. No. 177,072
Int. Cl. C07c 3/54
U.S. Cl. 260—683.48                                       5 Claims

ABSTRACT OF THE DISCLOSURE

In an alkylation of an isoparaffin with an olefin, a light hydrocarbon phase, e.g., a propane phase and an acid phase, both phases containing organic fluoride, are recovered upon fractionation of the alkylation reaction effluent, the acid phase is contacted with isoparaffin to react out organic fluoride, isoparaffin phase and acid phase are thus obtained, the isoparaffin phase containing alkylate produced from the organic fluoride, the acid phase now containing relatively less organic fluoride then being admixed with the light hydrocarbon or propane containing phase, thus removing into the acid organic fluoride in said phase whereupon the acid phase is reacted with isoparaffin to produce additional alkylate from the organic fluoride.

---

This invention relates to the alkylation of an isoparaffin with an olefin. It also relates to the removal of organic fluoride from propane to be yielded from an alkylation of an isoparaffin with an olefin.

In one of its concepts, the invention provides a process wherein in an alkylation process wherein an isoparaffin is alkylated with an olefin and there are formed organic fluorides, the depropanizer overhead vapor is condensed to form an acid phase containing organic fluorides and a propane phase containing organic fluorides, the acid phase containing organic fluorides is intimately admixed with isoparaffin, thus reacting out alkyl fluoride, producing alkylate, yielding a cleaner acid or acid containing little or no organic fluorides, the propane phase from the accumulator is contacted with the last mentioned acid, thus removing from the propane phase into the acid phase organic fluorides, the propane is separated for further treatment while the acid containing fluorides is admixed with isoparaffin to react out the organic fluorides which have been absorbed into said acid.

The invention is particularly applicable to the alkylation of an isoparaffin, for example, isobutane and/or isopentane with an olefin, e.g., ethylene and/or a higher olefin, for example, propylene, butylene, hexylene, in which process depending upon conditions of operation there are formed organic fluorides which is advantageous to recover.

It has now occurred to me that by reacting the acid phase from the accumulator of the usual depropanizer in the usual alkylation operation which yields fluorides in the acid phase with isoparaffin, for example, fresh feed or makeup isoparaffin that I can clean up the acid phase by alkylating out the fluorides therein and further that I can combine this cleaner acid with the propane from the depropanizer overhead accumulator to remove the propane into this acid organic fluorides, before the propane is yielded from the system, then passing the acid containing fluorides into intimate admixture with isoparaffin to react out the last mentioned fluorides therefrom.

It is an object of this invention to provide a method for the alkylation of an isoparaffin with an olefin. It is a further object of this invention to provide a process for recovery of alkyl fluoride formed in an alkylation of an isoparaffin with an olefin in the presence of hydrogen fluoride catalyst. It is a still further object of this invention to provide for removal of organic fluoride from a propane stream to be yielded from an alkylation of an isoparaffin with an olefin. It is a still further object of the invention to produce a hydrogen fluoride stream within an alkylation of an isoparaffin with an olefin in the presence of hydrogen fluoride which is low in fluoride content so that it can be used to remove organic fluoride from propane containing the same. A further object still of the invention is to provide in a process for the alkylation of an isoparaffin with an olefin a combination of steps resulting in removal and recovery of organic fluorides as additional alkylate, employing only streams available in the operation.

Other aspects, concepts, objects and the several advantages of the invention are apparent from a study of this disclosure, drawing and the appended claims.

According to the present invention, in an alkylation of an isoparaffin with an olefin, yielding a reaction effluent from which there is recovered a light hydrocarbon phase, e.g., a propane phase, and an acid phase, both phases containing organic fluoride, the steps which comprise admixing the acid phase with isoparaffin, thus reacting out therefrom organic fluoride contained therein, separating isoparaffin and acid phases, the isoparaffin phase containing alkylate produced from the organic fluorides, and the acid phase containing relatively low in organic fluorides, admixing the last mentioned acid phase low in organic fluorides with the light hydrocarbon or propane containing phase thus removing into the acid organic fluorides in said phase and then contacting the acid now containing organic fluorides with isoparaffin to react said organic fluorides to produce additional alkylate.

In the drawing there is shown diagrammatically an operation according to the invention.

Referring now to the drawing, olefin, e.g., ethylene and a higher olefin, for example, propylene, is fed by 1, together with isoparaffin, e.g., isobutane, fed by 2, together with acid catalyst fed by 3 to HF alkylation zone 4. After settling and removal of acid by means not shown, the hydrocarbon effluent is passed by 5 to fractionator 6 by which alkylate is removed by 7, normal butane is removed as a vapor at 8, liquid recycle isobutane is removed at 9 and recycled by 2 to zone 4 and from which there is removed as overhead propane, organic fluorides and HF passed by 10 through cooler condenser 11 to accumulator 12 wherein an upper propane phase forms and is removed by 13 while acid collects in keg 14 and is passed by 15 to eductor 16. The acid and the propane contain some alkyl fluorides or organic fluorides and both streams are treated according to the invention to reduce their respective organic fluorides contents whereupon the acid is then used, also according to the invention, to treat a portion of the propane phase. A portion of the propane phrase is returned to fractionator 6 by 13A as reflux therefor. These fluorides include ethyl fluorides, especially when ethylene is a feed olefin.

According to the invention, there is fed to eductor 16 by way of 17 and pump 18 dry isobutane feed under conditions such that the pressure drop across 16, for example, from 330 p.s.i.g. to 300 p.s.i.g., will suck into the isobutane the HF and alkyl fluorides from 15 yielding a stream 19 which is passed to isobutane settler 20. In isobutane settler 20, acid is settled and isobutane phase is taken off by 21 and passed by 22 to 17 to the suction of pump 18 for reuse as described. Acid is withdrawn from isobutane settler 20 by 23 and passed in part by 3 to the HF alkylation zone 4 and in part, also according to the invention, by 24 to eductor 25 which is powered by pump 26, which pumps the propane containing phase from accumulator 12 by 13 and by 27 to eductor 25, sucking the acid in 24 into 25 forming a mixture which is passed by 28 to propane settler 29. Further, according to the invention, propane forms a phase taken overhead at 30 to HF stripper 31 while acid and organic fluorides are passed by 32 to eductor 16.

Overhead from HF stripper which includes some propane is passed by 33 to 10 and by 10 through cooler condenser 11 ultimately to accumulator 12 while propane is yielded from the system at 34.

It will be seen that in isobutane settler 20, alkylate which has been formed from the organic fluorides with the isobutane in the presence of acid is also passed by 21 to the alkylation zone for ultimately recovery from the foot of fractionator 6.

The acid which is withdrawn at 23 from isobutane settler 20 is, according to the invention as can be readily understood by one skilled in the art having possession of this disclosure, an acid relatively low in organic fluorides because of the alkylation which takes place upon admixture of the acid and fluorides with the isobutane beginning at eductor 16. Thus, according to the invention a better grade acid is provided and, therefore, used in eductor 25 to recover fluorides from the propane phase removed from accumulator 12 by 13 before propane is to be yielded from the system at 34.

The following is a typical operation according to the invention.

TYPICAL OPERATION

Fractionator (6):
  Pressure, p.s.i.g. .......................... 285
  Top temp., °F. .............................. 129
  Bottom temp., °F. ........................... 425
Isobutane settler (20):
  Pressure, p.s.i.g. .......................... 300
  Temp., °F. .................................. 100
Propane settler (29):
  Pressure, p.s.i.g. .......................... 320
  Temp., °F. .................................. 100
Dry (organic fluoride-free) isobutane feed (17):
  Barrels per day ............................. 1,000
  Vol. percent iC$_4$ ......................... 95
Recycle iC$_4$/fresh iC$_4$ vol. ratio to 16 ..... 1:1
HF and organic fluorides to eductor (16):
  Barrels per day ............................. 920
  Organic fluorides, p.p.m. by wt. ............ 250
Propane stream to eductor (25):
  Barrels per day ............................. 800
  Organic fluorides, p.p.m. by wt. ............ 400
HF to eductor (25):
  Barrels per day ............................. 800
  Organic fluorides, p.p.m. by wt. ............ 10
Treated feed isobutane to alkylation (21):
  Barrels per day ............................. 1,000
  Organic fluorides, p.p.m. by wt. ............ [1]284
HF to reactor from settler (20):
  Barrels per day ............................. 115
  Organic fluorides, p.p.m. by wt. ............ 10
Propane product from 31:
  Barrels per day ............................. 500
  Organic fluorides, p.p.m. by wt. ............ 15

[1] Some or all may be converted into alkylate in this contact.

When the propane is not extracted to remove organic fluorides, using HF low inorganic fluorides according to the invention as described the organic fluoride content is about 400 p.p.m. by weight. The invention will save above $13,000 per year in HF and in alkylate, plus the decrease in alumina treatment of product propane to remove organic fluorides on the basis of the above streams. Also, pollution will result. Thus, as known, the alumina causes organic fluoride to breakdown, resulting in formation of aluminum fluoride in the alumina which must be disposed of. There may even result a heavy polymer in propane.

In Ser. No. 138,991, filed Apr. 30, 1971, there is set forth a process for the alkylation of at least one isoparaffin with ethylene which comprises conducting the alkylation catalyst in the presence of a substantial amount of a higher olefin.

Olefin feed materials which can be used include ethylene and at least one heavier olefin such as propylene, butene-1, cis-butene-2, trans-butene-2, isobutene, amylenes, or admixtures of olefins heavier than ethylene, and also the listed olefins heavier than ethylene alone or in admixtures absent the ethylene.

Isoparaffins include isobutane and isopentane, preferably isobutane alone as the isoparaffin.

In the alkylation zone temperatures of 40 to 150° F. can be used at pressure sufficient to maintain liquid phase. The same ranges of temperatures, with pressures to maintain liquid phase can be used in recontact zones 20 and 29. The hydrocarbon to HF catalyst volume ratios can range from about 1:10 to about 2:1 in the HF alkylation zone 4, and also in recontact zones 20 and 29. In the zone 4, the isobutane-to-olefin mol ratio can be about 2:1 to about 25:1.

Fractionation zone 6 and HF stripper 31 are conventional and ranges of operating conditions are well known to those skilled in the art. For example, the stripper 31 can operate at 315 p.s.i.g. aind a bottom temperature of about 145° F.

Sufficient pressure drop is effected across eductors 16 and 25 to effect proper flow and mixing. For example a $\Delta P$ of 10 to 100 p.s.i. can be used. Other mixing means, of course, can be used in lieu of the eductor-pipe conduit means (16 and 19) and (25 and 28) illustrated.

Reasonable variation and modification are possible within the scope of the foregoing disclosure, drawing and the appended claims, the essence of which is that there has been provided a process for the improvement of a hydrogen fluoride alkylation of an isoparaffin with an olefin in which alkyl fluoride or organic fluorides are formed which comprises condensing and settling and, therefore, separating into a hydrocarbon phase and an acid phase a stream resulting from the alkylation and recovered therefrom by fractionation and comprising hydrogen fluoride, propane and organic fluorides, combining with the acid phase containing fluorides thus obtained isoparaffin thus to cause alkylation of the isoparaffin by the organic fluorides, separating isoparaffin containing alkylate, thus obtained, from resulting acid from which organic fluorides have been substantially eliminated, intimately admixing the hydrocarbon phase containing propane with the last mentioned acid, thus removing into the acid organic fluorides from the propane or hydrocarbon phase and, as desired, adding acid containing the organic fluorides from the propane to the alkylation of the acid phase containing fluorides or otherwise alkylating the same.

I claim:

1. A process for the alkylation of an isoparaffin with an olefin which comprises alkylating in an alkylation zone under alkylating conditions a first reaction mixture of an isoparaffin with at least one olefin and settling said reaction mixture into a first acid phase and a first hydrocarbon phase containing HF catalyst, fractionating said hydrocarbon phase thus obtained to separate from an alkylate a light hydrocarbon stream comprising propane, HF and organic fluorides, settling said stream into a second hydrocarbon phase consisting essentially of propane and organic fluorides and a second HF phase containing organic fluorides, returning a portion of said second hydrocarbon phase as reflux to said fractionating step, contacting said second HF phase containing organic fluorides with an excess of isoparaffin to form a second reaction mixture under alkylating conditions whereby said isoparaffin is alkylated by said organic fluorides, settling said second reaction mixture to separate the excess unreacted isoparaffin now containing alkylate resulting from the alkylation of isoparaffin with organic fluorides which were contained in said HF phase from a third HF phase having a substantially reduced organic fluorides content, contacting said third HF phase of reduced organic fluorides content with a portion of said second hydrocarbon phase to remove therefrom into the HF phase the organic fluorides from said propane and yielding said propane.

2. A process according to claim 1 wherein the HF into which the organic fluorides have been removed is combined under alkylation conditions with isoparaffin to alkylate the isoparaffin with the organic fluorides which have been removed into said HF.

3. A process according to claim 1 wherein the HF into which the organic fluorides have been removed is combined with said excess of isoparaffin and said HF phase containing organic fluorides for simultaneous alkylation of said excess isoparaffin with the organic fluorides in both the HF phases.

4. A process according to claim 1 wherein the isoparaffin is at least one of isobutane and isopentane and the olefin is at least ethylene.

5. A process according to claim 4 wherein in addition to the ethylene there is present at least one higher olefin selected from propylene, butylene, amylene and hexylene.

References Cited
UNITED STATES PATENTS

| | | | |
|---|---|---|---|
| 3,204,010 | 8/1965 | Van Pool | 260—683.42 |
| 3,204,011 | 8/1965 | Hettick et al. | 260—683.48 |

DELBERT E. GANTZ, Primary Examiner

G. J. CRASANAKIS, Assistant Examiner

U.S. Cl. X.R.

260—683.42